United States Patent [19]

Shou et al.

[11] Patent Number: 5,467,376
[45] Date of Patent: Nov. 14, 1995

[54] INCREMENTING AND DECREMENTING COUNTER CIRCUITS

[75] Inventors: Guoliang Shou; Sunao Takatori; Makoto Yamamoto, all of Tokyo, Japan

[73] Assignees: Yozan Inc.; Sharp Corporation, both of Tokyo, Japan

[21] Appl. No.: 308,460

[22] Filed: Sep. 19, 1994

[30] Foreign Application Priority Data

Sep. 20, 1993 [JP] Japan .................. 5-256377
Sep. 20, 1993 [JP] Japan .................. 5-256530

[51] Int. Cl.⁶ .................. H03K 25/00
[52] U.S. Cl. .................. 377/94; 327/75; 327/126; 377/106
[58] Field of Search .................. 377/94, 95, 96, 377/106; 327/75, 126

[56] References Cited

U.S. PATENT DOCUMENTS

| | | | |
|---|---|---|---|
| 2,677,762 | 5/1954 | Cohen et al. .................. | 377/96 |
| 2,817,771 | 12/1957 | Barnothy .................. | 327/75 |
| 3,041,469 | 6/1962 | Ross .................. | 327/75 |
| 4,542,370 | 9/1985 | Yamada et al. .................. | 327/75 |

OTHER PUBLICATIONS

Souda, Yasushi, "91 The CMOS Device Manual", CQ Shuppansha, 1991, pp. 113–117 and 138–139.

*Primary Examiner*—John S. Heyman
*Attorney, Agent, or Firm*—Cushman, Darby & Cushman

[57] ABSTRACT

A counter circuit converts a full count to a zero count and a zero count to a full count. An incrementing counter circuit according to the present invention has a plurality of threshold circuits with stepwise thresholds. An output of the highest threshold circuit is used as a cut off signal for other threshold circuits. A decrementing counter circuit according to the present invention has a plurality of threshold circuits from the lowest threshold to the highest thresholds. An output of the lowest threshold circuit is used as a closing signal for other threshold circuits.

12 Claims, 5 Drawing Sheets

INCREMENTING AND DECREMENTING COUNTER CIRCUITS

BACKGROUND OF THE INVENTION

1. Field of the Invention

The present invention relates to a counter circuit, especially to a circuit which generates a quantized voltage corresponding to an analog input voltage with functions of outputting zero count when the generated value is the full count and of outputting the full count when the generated value is zero count.

2. Description of Related Art

Digital technology in computer science has developed with improvements in fine processing technology, however the cost of equipment has increased. Thus, an analog or multivalued counter is desirable.

Quantization is required to provide multiple values of analog data. Conventionally, a circuit using potential divider composed of serial resistances has been used. However, such a circuit consumes large amounts of electric power due to a constant electric current and the output values fluctuate when a reference voltage changes.

Thus, a practical multivalue counter is not known.

SUMMARY OF THE INVENTION

The present invention solves the conventional problems by providing a counter circuit for realizing functions for converting a full count to a zero count and a zero count to a full count in a multivalued counter.

A counter circuit as an incrementing circuit according to the present invention has a plurality of threshold circuits with stepwise thresholds. The output of the highest threshold circuit is used as a cut off signal for other threshold circuits.

A counter circuit as a decrementing circuit according to the present invention has a plurality of threshold circuits from a lowest threshold to a highest threshold. The output of the lowest threshold circuit is used as a cut off signal for other threshold circuits.

PREFERRED EMBODIMENT OF THE PRESENT INVENTION

Hereinafter, an embodiment of a counter circuit according to the present invention is described with reference to the attached drawings.

Figure 1:
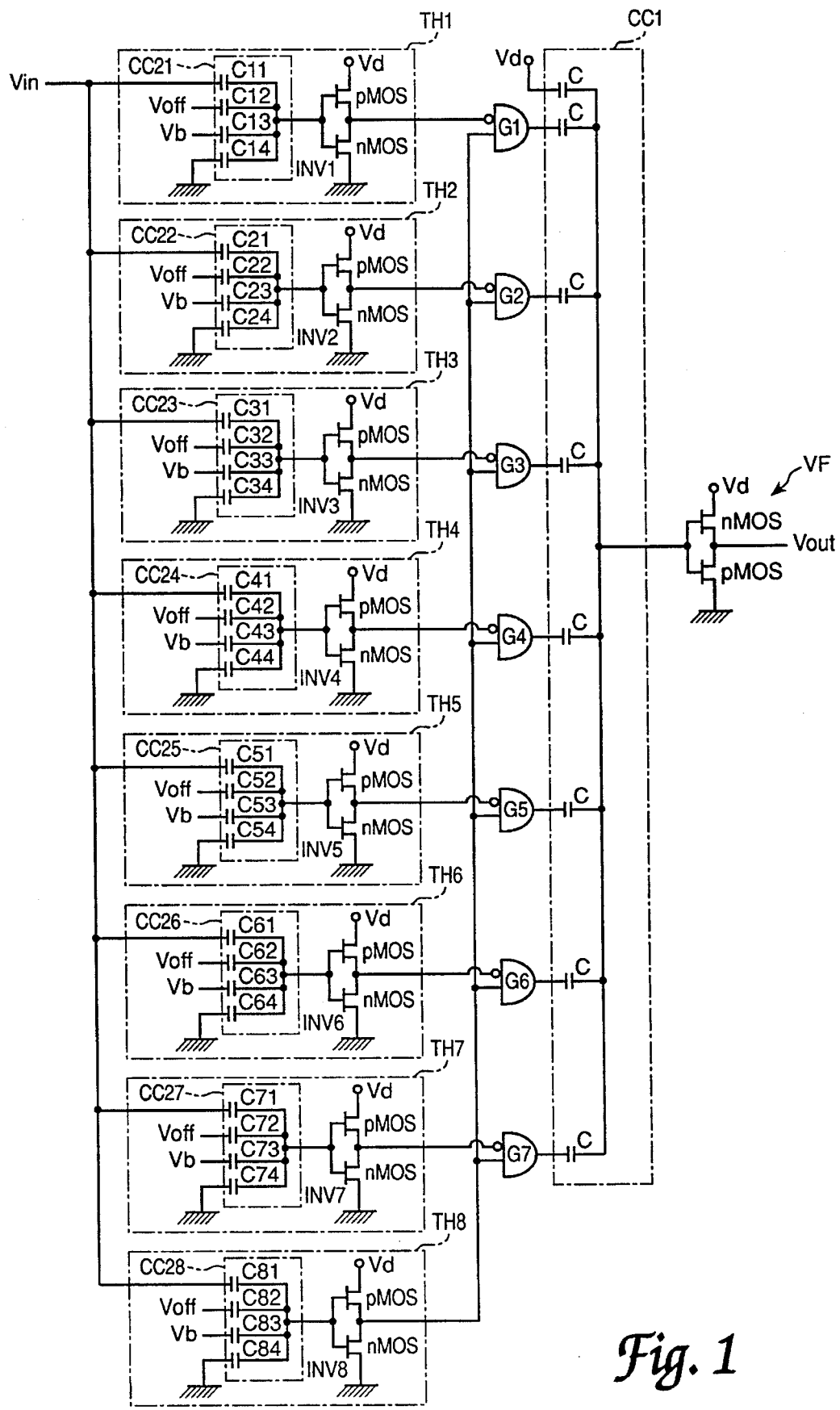
FIG. 1 is a circuit diagram showing the first embodiment of an increment circuit relating to the present invention.

In FIG. 1, an increment circuit has a plurality of threshold circuits TH1 to TH8 (8 threshold circuits are shown in FIG. 1), which have stepwise thresholds from the lowest threshold to the highest threshold, respectively.

Each output of circuits TH1 to TH7 is connected to switching means G1 to G7, respectively. Outputs of these switching means G1 to G7 are integrated by a capacitive coupling CC1. The output of threshold circuit TH8, which has the highest threshold value, is inputted to all switching circuits, and operate to close the switching circuits when the output of TH8 is high.

Each of switching circuits G1 to G7 calculates an AND logic of an inverted output of the corresponding thresholding circuit THi (i=1 to 7), and the output of TH8. When the output from THi and TH8 is represented by O(THi) and O(TH8), the above AND logic is $\overline{O(THi)} \times O(TH8)$. In this manner, G1 to G7 are controlled by TH8.

Capacitive coupling CC1 is composed of a plurality of parallel capacitances Cs. When output voltages of switching means G1 to G7 are defined as V1 to V7, then the output of CC1 is shown by Formula 1.

$$\sum_{i=1}^{7} Vi/8 \tag{1}$$

The capacitive coupling CC1 includes an additional capacitance for receiving a voltage Vd, equivalent to the outputs of switching circuits G1 to G7, so as to integrate 8 voltages.

Threshold circuits TH1 to TH8 generate outputs corresponding to input voltages greater than threshold voltages Vt1 to Vt8, respectively. CC1 generates the following outputs in response to the input voltage.

| INPUT VOLTAGE | OUTPUT VOLTAGE |
| --- | --- |
| Vin<Vt1 | Vd/8 |
| Vt1 ≦ Vin < Vt2 | Vd/4 |
| Vt2 ≦ Vin < Vt3 | 3Vd/8 |
| Vt3 ≦ Vin < Vt4 | Vd/2 |
| Vt4 ≦ Vin < Vt5 | 5Vd/8 |
| Vt5 ≦ Vin < Vt6 | 3Vd/4 |
| Vt6 ≦ Vin < Vt7 | 7Vd/8 |
| Vt7 ≦ Vin < Vt8 | Vd |

When Vin is equal to or greater than Vt8, G1 to G7 are opened by the output of TH8, and the output of CC1 changes to Vd/8 again. That is, Vd/8 is obtained when Vt8 is less than Vin.

Figure 2:
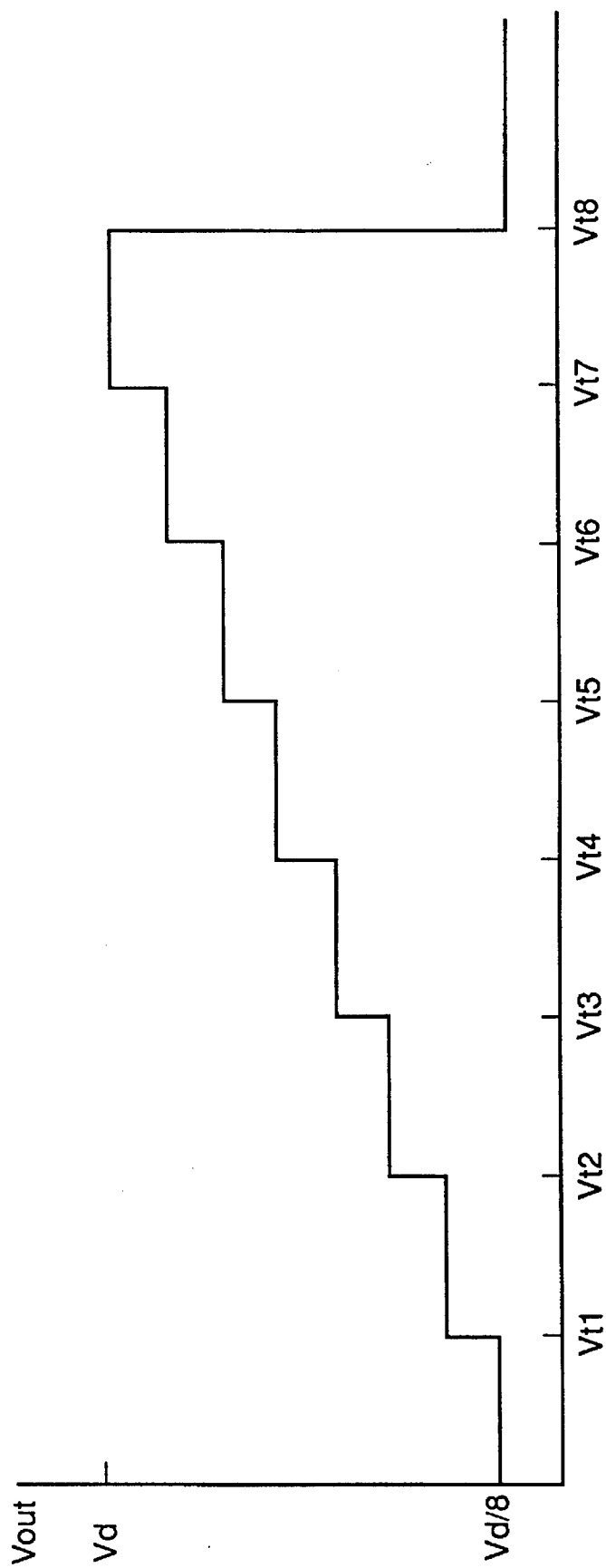
FIG. 2 is a graph showing input and output characteristics of the embodiment.

Therefore, a full count value may be changed to a zero count value, and it is possible to treat any number similarly to a typical digital counter. When the count value is less than full, the count value is incremented by "1" by the additional voltage Vd in the capacitive coupling CC1. This function is adaptable for outputting data after increasing the inputted data. FIG. 2 shows the above characteristics in graphical form. Hereinafter, representative threshold circuit TH1 is described. Threshold circuits TH1 to TH8 are similarly constructed.

TH1 consists of a capacitive coupling CC21 with parallel capacitances C11 to C14 and an inverter INV1 which receives at its gate the output of the capacitive coupling. INV1 generates low level output when an output of capacitive coupling CC21 is greater than a threshold value of INV1. The low level voltage is outputted G1. Capacitances C11 to C13 are connected to input voltage Vin, offset voltage Voff and bias voltage Vb, respectively. Capacitance C14 is grounded. Therefore, the output of capacitive coupling CC21 is shown by formula 2.

$$\left(C11Vin + C12Voff + C13Vb\right) / \sum_{i=1}^{4} C1i \quad (2)$$

When a particular threshold voltage of TH1 is Veth, a relationship between Vt1 and Veth is shown by formula 3.

$$\left(C11Vt1 + C12Voff + C13Vb\right) / \sum_{i=1}^{4} C1i = Veth \quad (3)$$

$$Vt1 = Veth \sum_{i=1}^{4} C1i - C12Voff - C13Vb$$

Vt1 is determined by Voff and Vb which are commonly inputted to each of circuits TH2 to TH8. The lowest level of the output is defined by Voff and the threshold value Vt1 is controlled by the relationship between C13 and Vb.

Similar threshold adjustment is performed in TH2 to TH8, as follows.

$$Vt2 = Veth \sum_{i=1}^{4} 2i - C22Voff - C23Vb \quad (4)$$

$$Vt3 = Veth \sum_{i=1}^{4} 3i - C32Voff - C33Vb$$

$$Vt4 = Veth \sum_{i=1}^{4} 4i - C42Voff - C43Vb$$

$$Vt5 = Veth \sum_{i=1}^{4} 5i - C52Voff - C53Vb$$

$$Vt6 = Veth \sum_{i=1}^{4} 6i - C62Voff - C63Vb$$

$$Vt7 = Veth \sum_{i=1}^{4} 7i - C72Voff - C73Vb$$

$$Vt8 = Veth \sum_{i=1}^{4} 8i - C82Voff - C83Vb$$

Furthermore, an output of the capacitive coupling CC1 for all outputs is connected to a voltage follower circuit VF, which is composed of nMOS and pMOS transistors. VF generates an output equivalent to the output of CC1 with high stability, independently of the load at the output side.

In the threshold processing or quantization mentioned above, less electric power is consumed because electric current is not generated in the stable condition.

Figure 3:
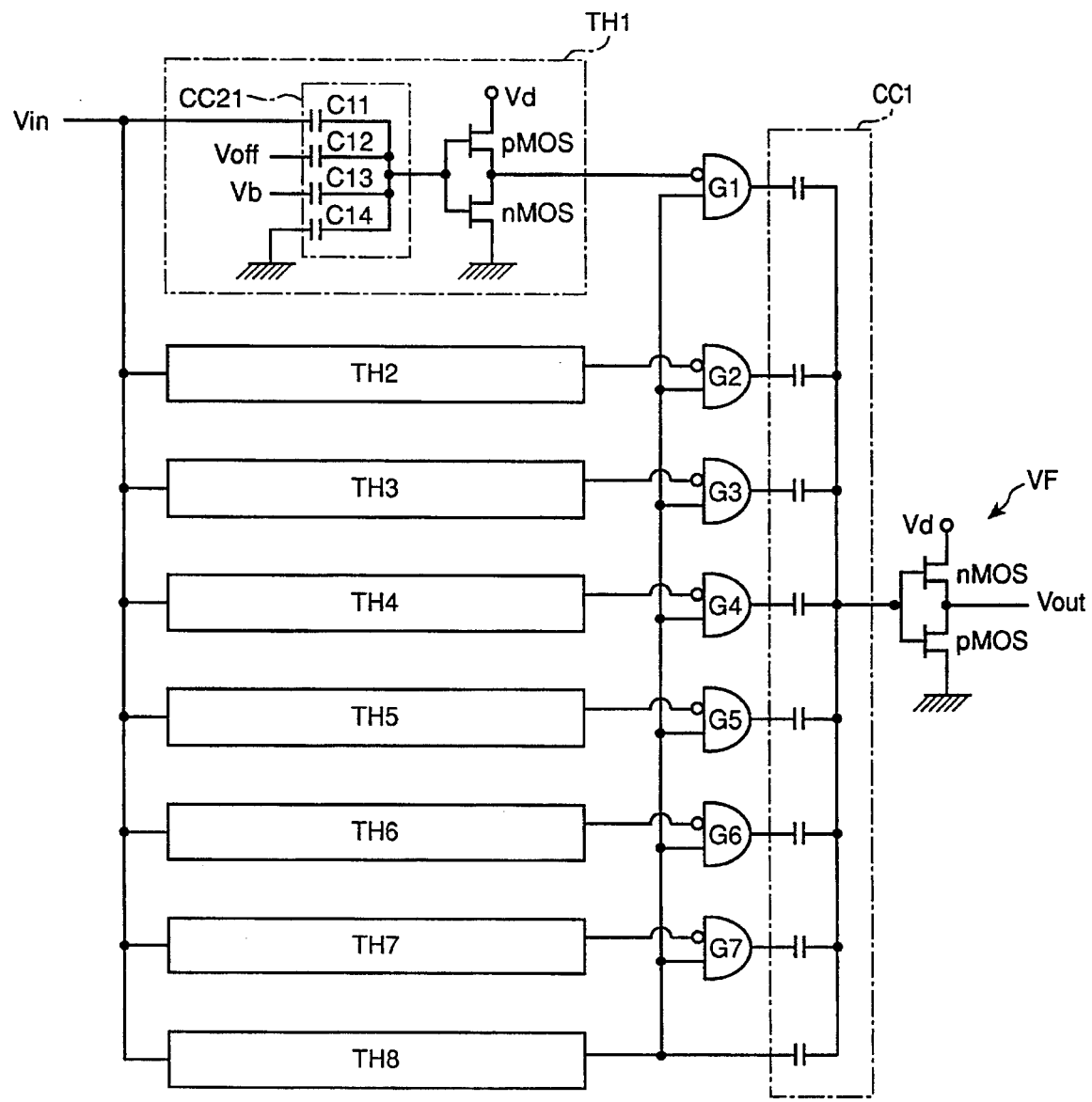
FIG. 3 is a circuit diagram showing the second embodiment of the present invention.

FIG. 3 shows the second embodiment of the present invention. Unlike the first embodiment, Vd is not inputted to CC1. Instead, the output of TH8 is used. TH8 outputs Vd before opening G1 to G7 causing the same result as Vd. Once G1 to G7 is cut off, TH8 becomes total output 0[V] because it has 0[V] output.

Hereinafter, another embodiment of a counter circuit as a decrement circuit is described.

Figure 4:
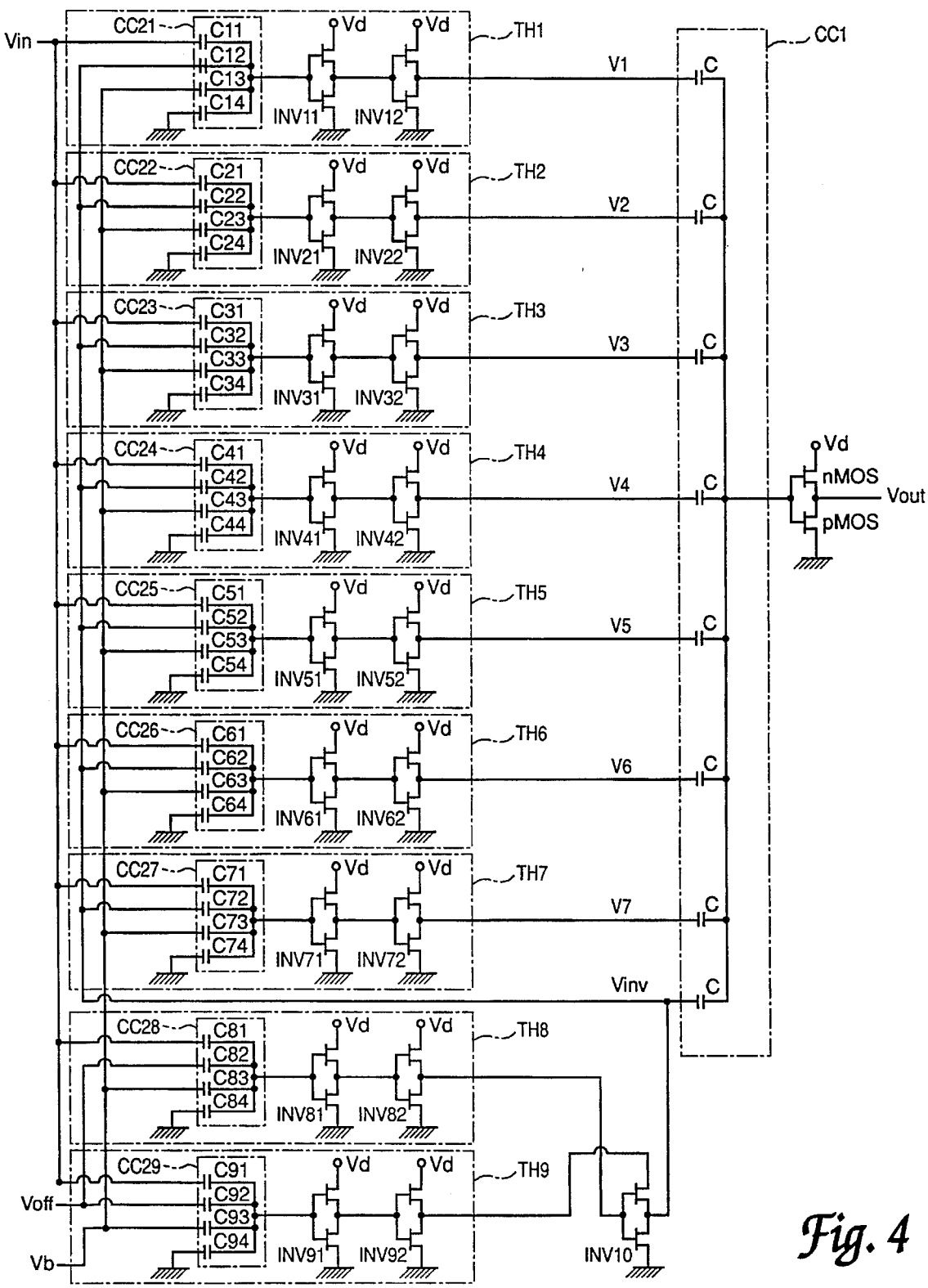
FIG. 4 is a circuit diagram showing an embodiment of an decrement circuit relating to the present invention.

FIG. 4 includes a plurality of threshold circuits TH1' to TH9' (9 threshold circuits are shown in FIG. 4). TH1' to TH7' have successively decreasing threshold values Vt1' to Vt7'. Threshold Vt8' of TH8' is equivalent to threshold Vt7' of TH7', and TH9' has the lowest threshold Vt9', which is lower than Vt7'.(For example, 0[V].)

An output of threshold circuit TH9' is inputted to an inverter INV10', and outputs of INV10' and TH1' to TH7' are inputted to capacitive coupling CC1'. These output voltages are defined as V1' to V7' and Vin' and each capacitance of CC1' is defined as C', then an output Vo' of CC1' is shown by Formula 5.

$$Vo' = Vinv'/8 + \sum_{i'=1}^{7} Vi'/8 \quad (5)$$

The output of TH8' is inputted to the gate of INV10', so that INV10' becomes conductive when TH8' generates a low level output (for example 0[V]). The output of INV10' is inputted to offset terminals of TH1' to TH7' so that TH1' to TH7' unconditionally generate high level outputs when INV10' outputs a high level.

Common input voltage Vin' is inputted to TH1' to TH9'. When Vin' is equal to or greater than Vt9', TH1' to TH7' generates a high level output due to the high level output of INV10'. Then the output of CC1' becomes the maximum value of Vo'=Vd'. This is the conversion of zero count to full count similar to the rotation counting of a digital counter.

When Vin' is equal to or greater than threshold voltage Vt7'=Vt8' of TH7' and TH8', the output of INV10' is a low level. The input voltage of the offset input of TH7' is a low level. The output of TH7' and output of CC1' are also low (for example, 0[V]). This is the conversion of count value "1" to "0".

When Vin' is equal to or greater than Vt6', the offset voltage input to TH6' becomes a low level, since the input voltage is sufficiently high to make only TH6' generate a high level output. The output of CC1' becomes (Vd'/8). This is the conversion of "2" to "1".

Hereinafter, the thresholding circuit TH1' is described. The thresholding circuits TH2' to TH9' are similarly constructed. TH1' consists of capacitive coupling CC21' with parallel capacitances C11' to C14', an inverter INV11' receiving at its gate an output of the capacitive coupling and an inverter INV12' receiving the output of inverter INV11'. INV12' generates a high level output Vd' when an output of capacitive coupling CC21' is greater than a threshold value of INV11'.

The capacitances C11' and C13' are connected to an input voltage Vin' (common to TH1' to TH9') and offset voltage Voff', respectively. The capacitance C12' is connected to Vinv' which is an output voltage of INV10'. The capacitance 14' is grounded. Therefore an output of capacitive coupling CC21' is shown by Formula 6.

$$\left(C11'Vin' + C12'Vinv' + C13'Vb'\right) / \sum_{i'=1}^{4} C1'i' \quad (6)$$

When a particular threshold voltage of INV11' is Veth', the relationship between Vt1' and Veth' is shown by Formula 7.

$$\left(C11'Vt1' + C12'Vinv' + C12'Vb'\right) / \sum_{i'=1}^{4} C1'i' = Veth' \quad (7)$$

$$Vt1' = Veth' \sum_{i'=1}^{4} C1'i' - C12'Vinv' - C13'Vb'$$

Vt1' is determined by Vinv' and Vb', and the threshold value Vt1' is controlled by the relationship between C13' and Vb'.

Similar threshold adjustment is performed in TH2' to TH8', as in formula 8.

$$Vt2' = Veth' \sum_{i'=1}^{4} C2'i' - C22'Vinv' - C23'Vb' \qquad (8)$$

$$Vt3' = Veth' \sum_{i'=1}^{4} C3'i' - C32'Vinv' - C33'Vb'$$

$$Vt4' = Veth' \sum_{i'=1}^{4} C4'i' - C42'Vinv' - C43'Vb'$$

$$Vt5' = Veth' \sum_{i'=1}^{4} C5'i' - C52'Vinv' - C53'Vb'$$

$$Vt6' = Veth' \sum_{i'=1}^{4} C6'i' - C62'Vinv' - C63'Vb'$$

$$Vt7' = Veth' \sum_{i'=1}^{4} C7'i' - C72'Vinv' - C73'Vb'$$

$$Vt8' = Veth' \sum_{i'=1}^{4} C8'i' - C82'Vinv' - C83'Vb'$$

$$Vt9' = Veth' \sum_{i'=1}^{4} C9'i' - C92'Vinv' - C93'Vb'$$

Threshold circuits TH1' to TH9' generate outputs from input voltages Vin whose threshold voltages are greater than Vt1' to Vt9', respectively. CC1' generates the following outputs in response to following input voltages Vin'.

| INPUT VOLTAGE | OUTPUT VOLTAGE |
| --- | --- |
| Vin' ≦ Vt9' | 0' |
| Vt9' ≦ Vin' < Vt8' | Vd' |
| Vt8' ≦ Vin' < Vt7' | Vd/8' |
| Vt7' ≦ Vin' < Vt6' | Vd/4' |
| Vt6' ≦ Vin' < Vt5' | 3Vd/8' |
| Vt5' ≦ Vin' < Vt4' | Vd/2' |
| Vt4' ≦ Vin' < Vt3' | 5Vd/8' |
| Vt2' ≦ Vin' < Vt1' | 6Vd/8' |
| Vt1' ≦ Vin' | 7Vd/8' |

Figure 5:
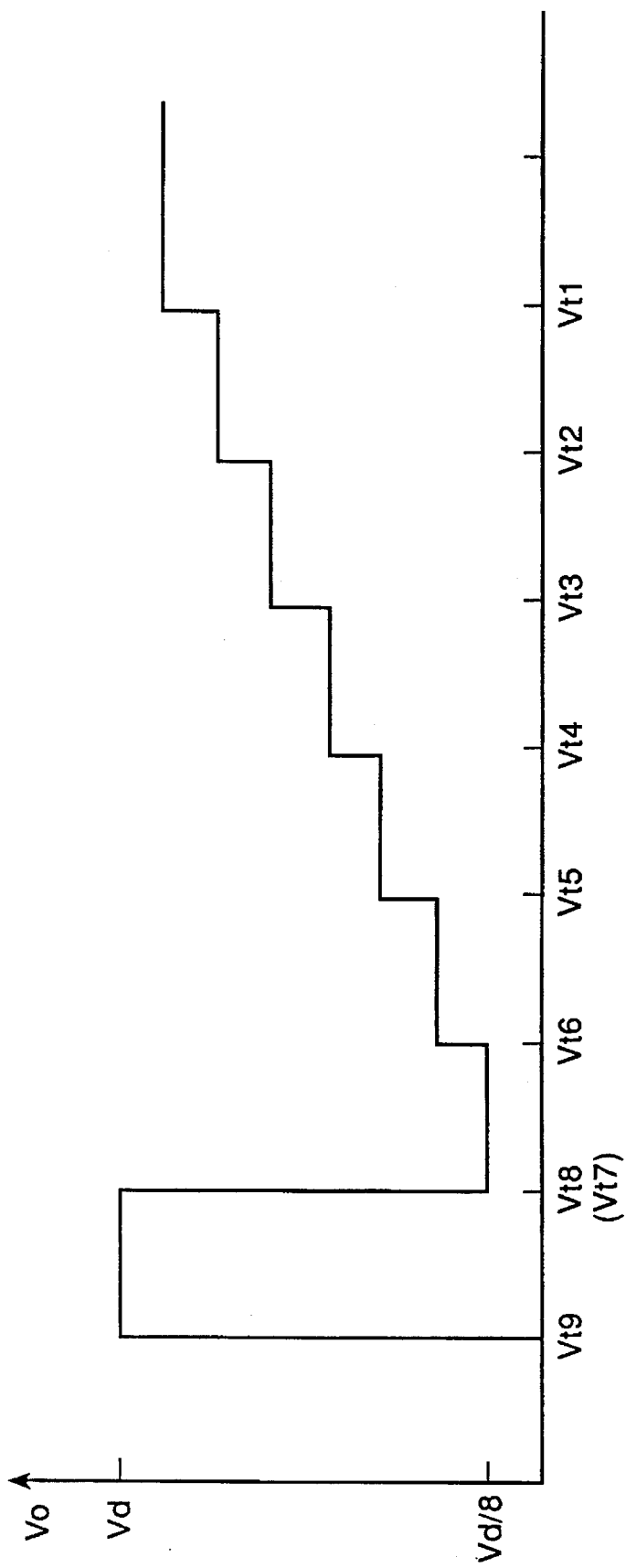
FIG. 5 is a graph showing input and output characteristics of the embodiment in FIG. 4.

Therefore, a zero count value may be converted to a full count value, and it is possible to treat any number similarly to a conventional digital counter. When a count value is more than "1", the count value is decremented by "1". This function is adaptable for outputting data after decreasing the inputted data. FIG. 5 shows the above characteristics in graphical form.

Furthermore, the output of the capacitive coupling CC1' is connected to a voltage follower circuit VF', which is composed of nMOS and pMOS transistors. VF' generates an output equivalent to the output of CC1' with high stability, independently from of load at the output side.

In the threshold processing or quantization mentioned above, less electric power is consumed because electric current is not generated in the stable condition. Grounded capacitances C14' to C94' in CC21"=' to CC29' keep formula 9 at a constant in response to changes in C13' to C93' for easy threshold adjustment.

$$\sum_{j'=1}^{4} Ci'j' \ (j' \text{ is from 1 to 9}) \qquad (9)$$

A counter circuit as an incrementing circuit and a decrementing circuit according to the present invention has a plurality of threshold circuits with stepwise thresholds. An output of the highest threshold circuit is used as a cut off signal for the other threshold circuits, therefore, it is possible to convert a full count to a zero count and a zero count to a full count in a multivalued counter.

What is claimed is:

1. An incrementing counter circuit comprising:

a plurality of threshold circuits each having a first capacitive coupling for receiving an input voltage, an offset voltage and a bias voltage and generating a weighted summation of said input voltage, said offset voltage and said bias voltage when said input voltage exceeds a threshold voltage, and having an inverting amplifier which is connected to receive said weighted summation, said inverting amplifier generating an amplifier output;

a master threshold circuit having a master capacitive coupling for receiving said input voltage, said offset voltage, and said bias voltage and generating a master weighted summation of said input voltage said offset voltage and said bias voltage, when said input voltage exceeds a master threshold voltage, and having a master inverting amplifier for receiving said master weighted summation and generating a control signal;

a plurality of switching means corresponding to said plurality of threshold circuits, each of said switching means receiving said control signal at a first switch input and said amplifier output of a corresponding one of said threshold circuits at a second switch input, and providing an output; and a second capacitive coupling connected to receive said output of each of said plurality of switching means, said second capacitive coupling providing a coupling output.

2. The incrementing counter circuit of claim 1, wherein said second capacitive coupling and said inverting amplifier are connected to receive a common drain voltage.

3. The incrementing counter circuit of claim 1, wherein said second capacitive coupling is also connected to receive said control signal.

4. The incrementing counter circuit of claim 2 or 3, wherein each of said plurality of switching means is a NAND gate, and wherein said second switch input is an inverting input.

5. The incrementing counter circuit of claim 2, wherein said inverting amplifier includes a PMOS transistor and an NMOS transistor, said PMOS transistor having a drain for receiving said common drain voltage and a source connected to a terminal of said NMOS transistor, and said NMOS transistor having a grounded terminal, wherein gates of said PMOS transistor and said NMOS transistor receive said weighted summation.

6. The incrementing counter circuit of claim 2, further comprising a voltage follower circuit which receives said coupling output and generates a counter output, said voltage follower circuit having a PMOS transistor and an NMOS transistor, said NMOS transistor having a drain for receiving said common drain voltage and a source connected to a terminal of said PMOS transistor, and said PMOS transistor having a grounded terminal, wherein gates of said PMOS transistor and said NMOS transistor receive said coupling output.

7. The incrementing counter circuit of claim 1, wherein said threshold voltage of each of said plurality of threshold circuits is different, and wherein said master threshold voltage is greater than each said threshold voltage.

8. The incrementing counter circuit of claim 3, wherein said inverting amplifier includes a PMOS transistor and an NMOS transistor, said PMOS transistor having a drain for receiving a common drain voltage and a source connected to a terminal of said NMOS transistor, said NMOS transistor having a grounded terminal, wherein gates of said PMOS transistor and said NMOS transistor receive said weighted summation.

9. The incrementing counter circuit of claim 3, further comprising a voltage follower circuit which receives said coupling output and generates a counter output, said voltage follower circuit having a PMOS transistor and an NMOS transistor, said NMOS transistor having a drain for receiving a common drain voltage and a source connected to a terminal of said PMOS transistor, said PMOS transistor having a grounded terminal, wherein gates of said PMOS transistor and said NMOS transistor receive said coupling output.

10. A decrementing counter circuit comprising:
   a first threshold circuit having a first capacitive coupling for receiving an input voltage, an offset voltage, and a bias voltage and for generating a first weighted summation of said input voltage, said offset voltage and said bias voltage when said input voltage exceeds a first threshold voltage, and a first amplifier circuit for receiving said first weighted summation and generating a first amplifier output;
   a second threshold circuit having a second capacitive coupling for receiving said input voltage, said offset voltage, and said bias voltage and for generating a second weighted summation of said input voltage, said offset voltage and said bias voltage when said input voltage exceeds a second threshold voltage higher than said first threshold voltage, and a second amplifier circuit for receiving said second weighted summation and generating a second amplifier output;
   an inverting amplifier, said inverting amplifier receiving said second amplifier output and first amplifier output, and generating an inverter voltage;
   a plurality of additional threshold circuits, each additional threshold circuit having an additional capacitive coupling for receiving said input voltage, said bias voltage, and said inverter voltage and generating an additional weighted summation of said input voltage, said bias voltage and said inverter voltage when said input voltage exceeds an additional threshold voltage, and an additional amplifier circuit for receiving said additional weighted summation and generating an additional amplifier output, wherein said additional threshold voltage of one of said remainder threshold circuits is substantially equal to said second threshold voltage and wherein said additional threshold voltage of each of the remainder of said additional threshold circuits is different and each said additional threshold voltage of each of the remainder of said additional threshold circuits is greater than said second threshold voltage; and
   an output capacitive coupling for receiving said inverter voltage and said additional amplifier output of each of said plurality of additional threshold circuits, and for generating a coupling output.

11. The decrementing counter circuit of claim 10, wherein each of said first, second, and additional amplifier circuits includes two inverters, each inverter having a PMOS transistor and an NMOS transistor, said PMOS transistor having a drain connected to receive a common drain voltage and a source connected to a terminal of said NMOS transistor, and said NMOS transistor having a grounded terminal, wherein gates of said PMOS transistor and said NMOS transistor receive said weighted summation.

12. The decrementing counter circuit of claim 10, further comprising a voltage follower circuit which receives said coupling output and generates a counter output, said voltage follower circuit having a PMOS transistor and an NMOS transistor, said NMOS transistor having a drain for receiving said common drain voltage and a source connected to a terminal of said PMOS transistor, and said PMOS transistor having a grounded terminal, wherein gates of said PMOS transistor and said NMOS transistor receive said coupling output.

\* \* \* \* \*